(12) United States Patent
Petkov

(10) Patent No.: US 10,692,267 B1
(45) Date of Patent: Jun. 23, 2020

(54) VOLUME RENDERING ANIMATIONS

(71) Applicant: Siemens Healthcare GmbH, Erlangen (DE)

(72) Inventor: Kaloian Petkov, Lawrenceville, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/269,599

(22) Filed: Feb. 7, 2019

(51) Int. Cl.
*G06T 13/20* (2011.01)
*G06T 15/50* (2011.01)
*G06T 15/08* (2011.01)

(52) U.S. Cl.
CPC ............ *G06T 13/20* (2013.01); *G06T 15/08* (2013.01); *G06T 15/50* (2013.01); *G06T 2210/41* (2013.01)

(58) Field of Classification Search
CPC ................................ G06T 13/20; G06T 15/08
See application file for complete search history.

(56) References Cited

U.S. PATENT DOCUMENTS

| | | | | |
|---|---|---|---|---|
| 6,081,278 A * | 6/2000 | Chen | ................. | G06T 17/00 345/473 |
| 9,292,954 B1 * | 3/2016 | Wrenninge | ............ | G06T 13/60 |
| 2005/0226483 A1 * | 10/2005 | Geiger | ................. | G06T 15/08 382/128 |
| 2008/0055310 A1 * | 3/2008 | Mitchell | ................. | A61B 6/469 345/424 |
| 2008/0246768 A1 * | 10/2008 | Murray | ................. | G06T 15/08 345/427 |
| 2008/0292194 A1 * | 11/2008 | Schmidt | ................. | G06T 7/0012 382/217 |
| 2010/0053160 A1 * | 3/2010 | Arakita | ................. | G06T 3/0037 345/424 |
| 2012/0154409 A1 * | 6/2012 | Poot | ................. | G06T 13/20 345/474 |
| 2018/0012397 A1 * | 1/2018 | Carothers | ................. | G06T 15/20 |

OTHER PUBLICATIONS

Myszkowski, Karol, "Perception-Based Fast Rendering and Antialiasing of Walkthrough Sequences", "IEEE Transactions on Visualization and Computer Graphics" Oct. 2000, vol. 6, pp. 360-379 (Year: 2000).*
J. Kautz, J. Snyder and P.-P. Sloan, "Fast, Arbitrary BRDF Shading for Low-Frequency Lighting," Proceedings of the 13th Eurographics Workshop on Rendering, vol. 2, pp. 291-296, 2002.
P. Debevec, "Rendering Synthetic Objects into Real Scenes: Bridging Traditional and Image-Based Graphics with Global Illumination and High Dynamic Range Photography," in SIGGRAPH 98, 1998.
P. Heckbert, "Non-overshooting Hermite Cubic Splines for Keyframe Interpolation," New York Institute of Technology, 1985.

(Continued)

*Primary Examiner* — Terrell M Robinson

(57) ABSTRACT

Systems and methods are provided for generating smooth transitions between volume rendering presets when the volume rendering is used as part of an animation system. A windowing-compensated look-up table interpolation is used to interpolate between adjacent keyframes that include user defined rendering presets. A constrained spline interpolation may be used to prevent overshooting.

20 Claims, 9 Drawing Sheets
(5 of 9 Drawing Sheet(s) Filed in Color)

(56) References Cited

OTHER PUBLICATIONS

Fang, Shiaofen, et al. "Volume morphing and rendering—An integrated approach." Computer Aided Geometric Design 17.1 (2000): 59-81.
V.Singh, D. Silver and N. Cornea, "Real-time volume manipulation," Proceedings of the 2003 Eurographics/IEEE TVCG Workshop on Volume Graphics, pp. 45-51, 2003.
Y. Wu, H. Qu, H. Zhou and M.-Y. Chan, "Focus + Context Visualization with Animation," in Pacific-Rim Symposium on Image and Video Technology, 2006.

\* cited by examiner

VOLUME RENDERING ANIMATIONS

FIELD

The present embodiments relate to medical imaging visualization.

BACKGROUND

Image processing and imaging visualization have provided a significant impact on a wide spectrum of media such as animations, movies, advertising, and video games. One area that has benefited greatly from imaging processing and visualization is medical imaging. For medical imaging, volume rendering of medical images has become a standard for many procedures and diagnostics. The visualization of human organs and body regions using volume rendering color capabilities may be used in several medical imaging modalities such as Computed Tomography (CT) and Magnetic Resonance Imaging (MRI).

Current medical imaging scanners provide three-dimensional (3D) submillimeter resolution that allows for various 2D and 3D post-processing and visualization techniques with excellent image quality. For example, advances in volume rendering are able to provide a physical rendering algorithm that simulates the complex interaction between photons and the scanned anatomical image to obtain photo-realistic images and videos. Cinematic volume rendering facilitates a photo-realistic image with seemingly real-life ambient and light effects which suggest to the human eye that this is "real". Additional features include high-performance rendering and highly advanced camera techniques, such as variable aperture diameters and motion blurring. Three-dimensional volume rendering capabilities may be used for visualization of the complex internal anatomy of a patient. Furthermore, volume rendering techniques offer relevant information for pre-operative planning as well as post-operative follow-up.

However, one drawback to providing high quality images such as for cinematic volume rendering is that the volume rendering process requires additional resources and may not be efficient or fast. One particular area that has difficulties is the process of animation of transition between two images. Due to the number of rendered frames requires (e.g. 15, 30, or 60 frames per second), animation is challenging to perform for high resolution visualization.

There are two broad categories for implementing animations, algorithmic and user-driven. For algorithmic animation, computer algorithms drive the animation, e.g. a physics engine computing rigid body dynamic for moving objects, automated camera path generation from detected landmarks in the data, automated visual abstractions of the data, data-driven lighting design, etc. Machine learning-based approaches play an important part in this category (e.g., artificial intelligence driven crowd simulations). An example from medical visualization is the automatic creation of 360° turntable animation from a user-specified rendering preset. For user-driven animation, the modeling application provides task-specific tools to design, preview and render computer animation. The animation specification can be low level, e.g., specifying each parameter on the animation timeline by drawing curves, or a higher-level specification of visual effects. Examples include the major 3D modelling applications (e.g., Maya, Inventor), 3D engines (e.g., Unity 3D), and many specialized visualization packages (e.g., Paraview).

In terms of the visualization, the existing approaches generally involve image-based blending, where images that vary a certain parameter of the visualization preset are rendered independently and then blended together. The resulting visualization is not correct for object movement or direct volumetric rendering. Additionally, in many cases, the existing animation systems do not support smooth transition between complex rendering parameters, such as the transfer function and (for image-based lighting) light probes. The system may require manual user intervention to resolve visual artifacts in the rendered videos, or the systems may employ algorithms that are too computationally expensive for many applicable uses.

SUMMARY

By way of introduction, the preferred embodiments described below include embodiments for a constrained spline interpolator, together with a windowing-compensated look-up table interpolation to address the challenge of creating a smooth transition between any two arbitrary presets for volume rendering.

In a first aspect, a method is provided for creating smooth transitions between volume rendering presets comprising look-up tables and windowing parameters for an animation system. A first look-up table for a first keyframe is resampled to reference windowing parameters. A second look-up table for a second keyframe is resampled to the reference windowing parameters. Windowing parameters are interpolated for a plurality of frames between the first keyframe and the second keyframe as a function of first windowing parameters and second windowing parameters. Look-up tables are interpolated for the plurality of frames as a function of the resampled first look-up table and the resampled second look-up table. The look-up tables are resampled to the respective windowing parameters. An animated sequence of frames is rendered using the first look-up table, the resampled plurality of look-up tables, and the second look-up table.

In an embodiment, the method further includes acquiring medical imaging data from a medical imaging system and where rendering comprises rendering the animated sequence of the medical imaging data using the first look-up table, the resampled plurality of look-up tables, and the second look-up table. The medical imaging system may be a magnetic resonance imaging system.

In an embodiment, the reference windowing parameters comprise windowing parameter values calculated as an average of windowing parameter values for the first keyframe and the second keyframe.

In an embodiment, interpolating the plurality of look-up tables comprises interpolating using an offset easing function.

In an embodiment, the method further includes resampling a third look-up table for a third keyframe to the reference windowing parameter and resampling a fourth look-up table for a fourth keyframe to the reference windowing parameters. The third keyframe and fourth keyframe are adjacent to the first keyframe and second keyframe. The resampled third look-up table and resample fourth look-up table are used for interpolating, resampling, and rendering.

In an embodiment, interpolating the plurality of look-up tables comprises interpolating using a constrained-spline interpolation that enforces a zero tangent if a parameter value is a local minima or maxima.

In an embodiment, the first keyframe and the second keyframe contain different volumetric data. The first look-up table and the second look-up table are resampled to a common coordinate system and resolution.

In an embodiment, the first look-up table and second look-up table are user generated.

In a second aspect, a method is provided for creating smooth transitions between look-up tables for an animation system. Windowing parameters are interpolated for frames between keyframes in a sequence of keyframes using a constrained-spline interpolation. Look-up tables are interpolated for intermediate frames between the keyframes in the sequence of keyframes using a windowing-compensated constrained spline interpolation. The windowing-compensated constrained spline interpolation includes resampling for each keyframe in the sequence of keyframes, a respective look-up table to produce a voxel classification under a reference window; interpolating the look-up tables for intermediate frames using a first quantity of adjacent look-up tables; and resampling the interpolated look-up tables for use with the interpolated windowing parameters. An animated sequence is rendered from the frames and keyframes.

In an embodiment, interpolating lighting parameters for frames between the keyframes in the sequence comprises using a spherical renderer-based interpolator for a light probe transition.

In an embodiment the keyframes contain different volumetric data and the look-up tables are resampled to a common coordinate system and resolution.

In an embodiment, the method further includes acquiring medical imaging data from a medical imaging system and rendering comprises rendering the animated sequence of the medical imaging data.

In a third aspect, a system is provided for generating animated medical imaging data. The system includes a medical imaging device, a memory, an image processor, and a display. The medical imaging device is configured to acquire medical imaging data. The memory is configured to store rendering presets for a plurality of keyframes in a sequence of keyframes. The image processor is configured to interpolate windowing parameters for frames between the plurality of keyframes using a constrained-spline interpolation; the image processor further configured to interpolate the rendering presets for frames between the plurality of keyframes using a windowing compensated constrained spline interpolation; the image processor further configured to render the frames and the keyframes into an animated sequence. The display is configured to display the animated sequence.

In an embodiment, the medical imaging device is a computed tomography imaging device or a magnetic resonance imaging device.

In an embodiment, the windowing compensated constrained spline interpolation uses reference windowing parameters calculated as an average of windowing parameter values for adjacent keyframes used for interpolation.

In an embodiment, the windowing compensated constrained spline interpolation uses an easing function.

In an embodiment, the windowing compensated constrained spline interpolation uses a constrained-spline interpolation that enforces a zero tangent if a parameter value is a local minima or maxima.

In an embodiment, the first keyframe and the second keyframe contain different volumetric data and the first look-up table and the second look-up table are resampled to a common coordinate system and resolution.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The components and the figures are not necessarily to scale, emphasis instead being placed upon illustrating the principles of the invention. Moreover, in the figures, like reference numerals designate corresponding parts throughout the different views.

DETAILED DESCRIPTION

Figure 1:
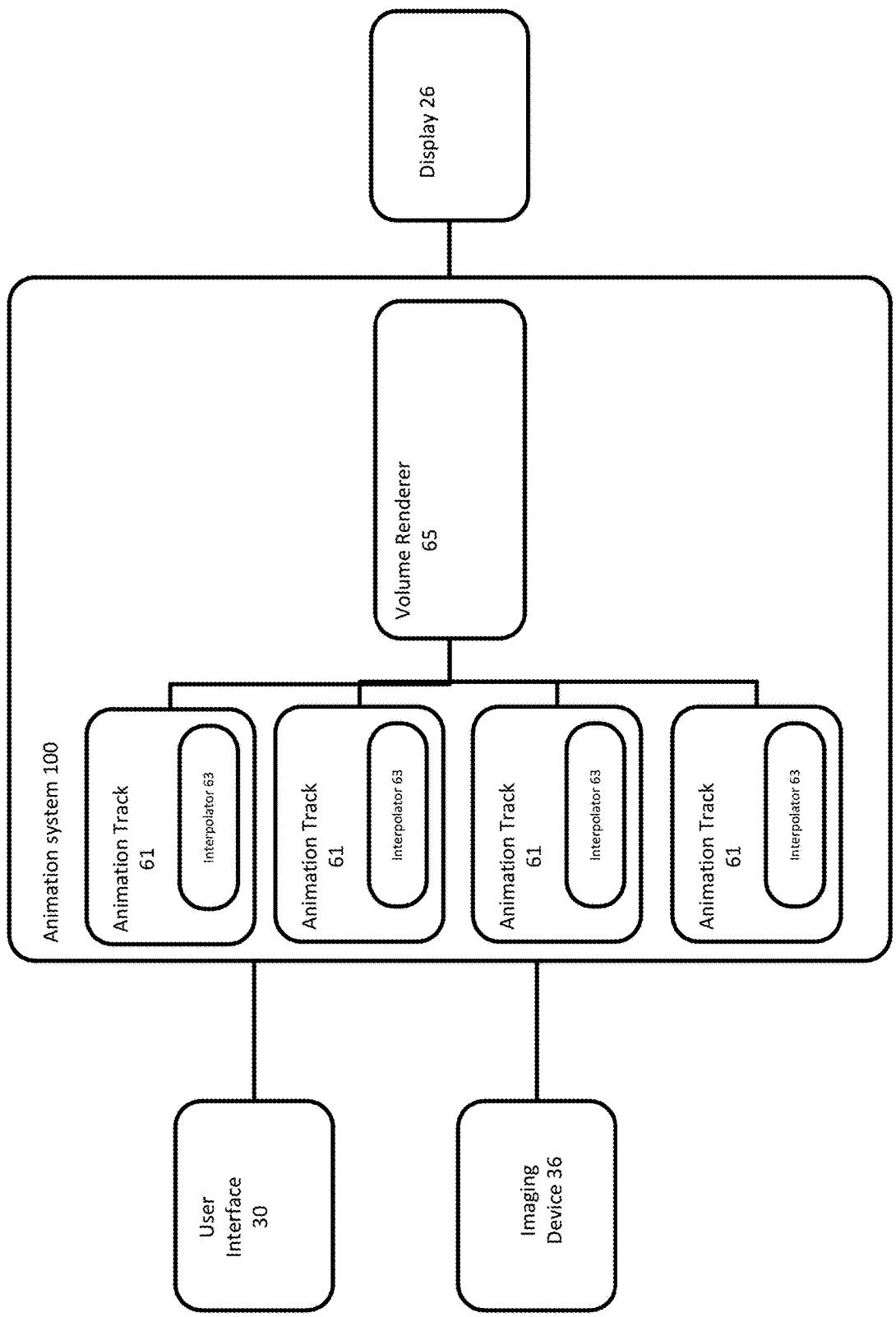
FIG. 1 depicts an example animation system for providing smooth transitions between volume rendering presets.

Embodiments provide for smooth transitions between volume rendering presets when the volume rendering is used as part of an animation system. A windowing-compensated look-up table interpolation is used to interpolate between adjacent keyframes that include user defined rendering presets. A constrained spline interpolation may be used to prevent overshooting.

For animations and volume rendering, keyframe animation may be used. Keyframe animation is the process by which critical frames in an animation sequence are individually crafted by a skilled animator, with all the intermediate frames generated by interpolation (either manual or automated). Based on the notion that an object has a beginning state or condition and will be changing over time, in position, form, color, luminosity, or any other property, to some different final form. Keyframing allows a user to provide only the conditions that describe the transformation of the object or view, and that all other intermediate positions may be derived from these.

As such, a keyframe in animation may be used as a frame that defines the starting and ending points of any smooth transition. A sequence of keyframes defines the visualization the viewer will see, whereas the position of the keyframes on the film, video, or animation defines the timing of the movement. Because only two or three keyframes over the span of a second do not create the illusion of movement, the remaining frames are sequence-filling intermediate frames.

For three-dimensional graphics, there are many parameters that can be changed for any one object. One example of such an object is a light. Lights, light probes, or other lighting techniques cause illumination, cast shadows, and create highlights. Lights have many parameters including light intensity, beam size, light color, and the texture cast by the light. Using keyframes, a user may change the beam size of the light from one value to another within a predefined period of time. At the start of the animation, a beam size value is set. Another value is set for the end of the animation. Thus, the software program automatically interpolates the two values, creating a smooth transition in images rendered with the interpolated values. Another example is color. A voxel may be assigned two different colors at two different points in time, e.g. with two different keyframes. The intermediate frames may be generated automatically by interpolating the two colors over the time between the two keyframes.

For rendering and animating medical images, look-up tables (LUT) may be used to store preset values for the parameters such as the colors, contrast, textures, or others. The look-up tables may include tens, hundreds, or thousands of parameters and the associated preset values. In an example, to assist users, dedicated color presets may be configured for different organs and use-case scenarios. Each preset may include a transfer function that maps, in the case of CT studies, the Hounsfield units (HU) to color and opacity values. The rendering presets and transfer functions may be edited interactively or created from scratch and saved as a new rendering preset. The interactivity provides customized rendering presets for a wide range of clinical use-cases, including any individually preferred settings and colors.

In addition to the look-up tables, windowing parameters may also be used when animating medical images. Windowing is the process of selecting a segment of the total range provided by the look-up tables and then using the values within that segment over the full range. For medical applications, windowing may be used to view one organ while hiding another organ or tissue. In an example, a user may select windowing parameters to view the heart. The selected windowing parameters result in the heart being depicted in the image while other organs or tissues such as the lungs are hidden or transparent. Windowing is used for medical diagnostics due to the complexities of the human body.

The embodiments described below may be applicable any time automated video export is used for volumetric workflows from a volume rendering system. While simple video templates, such as a spinning volume, may not benefit as much, current existing systems may not handle animations with complex state transitions or may produce non-smooth transition that require manual intervention. Applications that benefit the most may involve volume rendering of complex anatomy with multiple, significantly different presets within the same movie. Such cases may arise in automated report generation tools, fulfillment services, educational tools, and/or, as part of the workstation workflows for 3D/4D volume data acquisition modalities.

FIG. 1 depicts an animation system 100 configured for creating smooth transitions between volume rendering presets. The animation system 100 includes different components that function together to create an animated visualization given input image data and one or more preset values. The system includes an animation system 100 with a plurality of animation tracks 61 having interpolators 63 and a volume renderer 65. The system inputs image data (such as medical imaging data from an imaging device 36) and preset values from either a user (e.g., from user interface 30) or application. The system outputs an animated visualization of the input image data for display on a display 26.

The animation system 100 manages multiple animation tracks 61 for rendering or non-rendering parameters in the system and uses each animation track's 61 interpolator 63 algorithm to generate parameter values at arbitrary time steps during animation playback. The animation system 100 may include a collection of tracks that defines the dynamic property changes to associated objects. An animation allows navigation through the display, visualization of temporal changes, or alteration of layer and scene properties, such as layer transparency or the scene background.

The animation system 100 uses keyframe animation to generate the animated visualization. The animation system 100 inputs a set of discrete keyframes K1, K2, . . . , Kn for times t1, t2, to along an animation timeline, where each keyframe a collection of values of rendering parameters. The animation system 100 reconstructs a new set of values Km for the parameters for any arbitrary time tm. The reconstructed parameter values are then used when rendering images for the keyframe specified animation. The reconstruction may use an interpolating function. For complex functions interpolating provides a smooth transition. Non-interpolating functions may be used with artistic discretion for non-critical parameters, e.g. when specifying camera movements.

The volume renderer 65 implements a volume rendering algorithm, such as (but not limited to) slice-based rendering, single-pass ray casting, Monte Carlo volumetric path tracing, projection rendering, or surface rendering. The animation tracks 61 generate intermediate rendering parameter values for animation playback/recording and for animated state transitions. The Volume renderer uses the rendering parameter values to render volumes for the output animated sequence. In order to render the volumes, the volume renderer 65 uses voxel classification. Voxel classification uses a look-up table to derive optical properties (e.g., color and opacity) from the scalar voxel values (e.g., radiodensity in Hounsfield unit in the case of CT data). The look-up table for each frame may be generated by the volume renderer 65 (implicit) or the animation tracks 61 (explicit).

One existing approach is to interpolate the classification directly as part of the volume renderer 65. For a time t, so that tk<t<tk+1, the adjacent keyframes K and K+1 contain look-up tables Lk and Lk+1. During the rendering, every voxel is classified using both Lk and Lk+1, then linear interpolation is used to reconstruct the color and opacity for that voxel at time t. The transition then results in a smooth fade of one look-up table into the other. This is referred to as an implicit look-up table interpolation. One limitation of the implicit interpolation is that the lookup into two tables (linear interpolation) or four tables (spline interpolation) per optical property, per voxel is computationally expensive.

An alternative that is less computationally expensive is to use an explicit interpolation scheme for the look-up tables as part of the animation tracks 61 and not as part of the volume renderer 65. In an explicit look-up table interpolation, each entry is treated as a separate animation track 61 by the animation system 100, which then produces a new interpolated look-up table for each intermediate time t. No additional interpolation is needed within the rendering component. Since the look-up tables themselves are interpolated, this results in a visually more complex transition between the presets. However, in the case when the adjacent look-up tables differ significantly, and for example, if windowing is also changed as part of the presets, the intermediate look-up table and windowing may result in a classification that reveals visual structures not present in any of the original keyframes.

Figure 2:
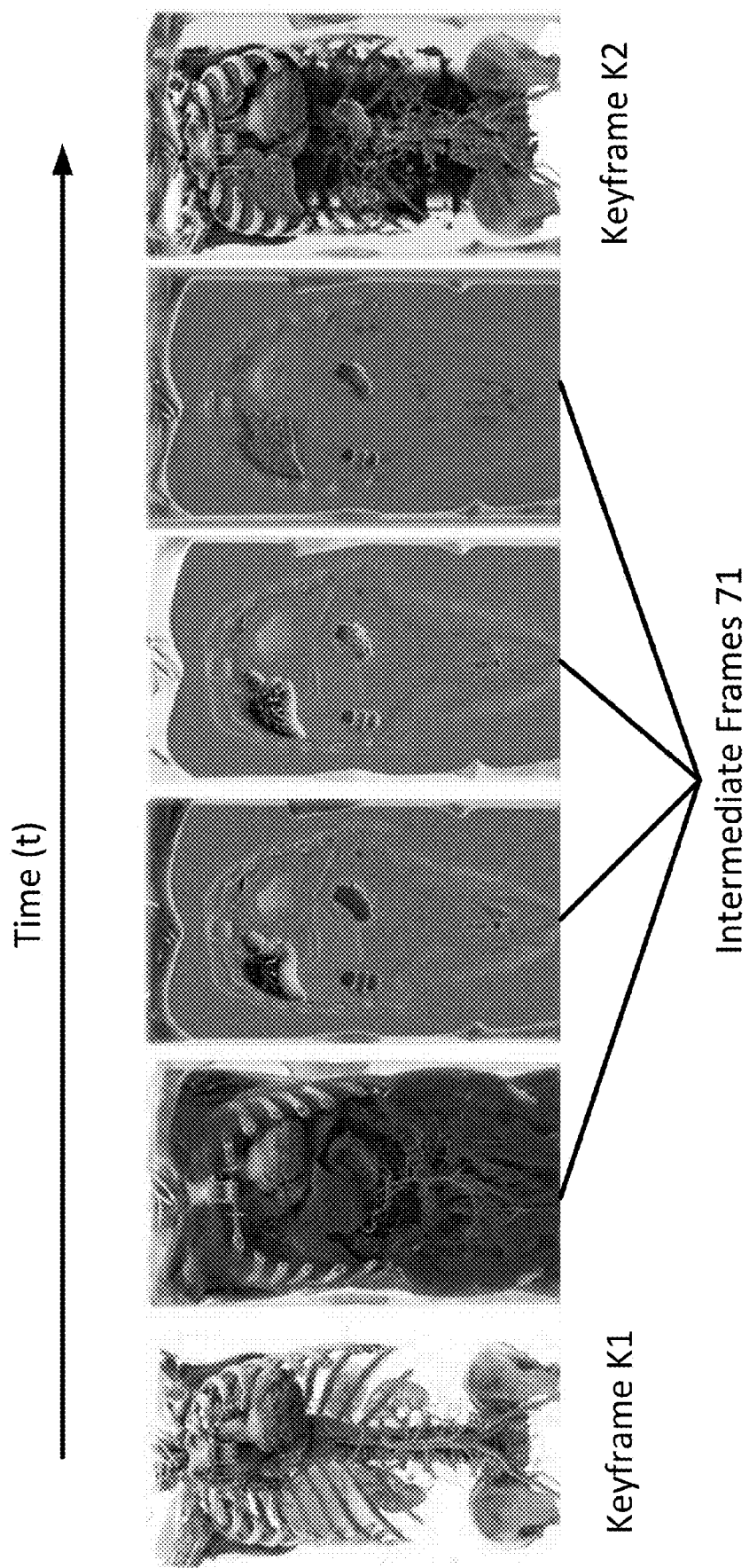
FIG. 2 depicts an example of a transition between volume rendering presets.

FIG. 2 depicts an example of an explicit look-up table interpolation that reveals visual structures not present in any of the keyframes. There are two keyframes K1 and K2 in FIG. 2 and four intermediate frames 71. The look-up tables for the four intermediate frames 71 are interpolated from the two keyframes K1 and K2. For a simple color change or opacity, explicit interpolation works well, however, for more complex transitions, for example those involving windowing changes, the results may be subpar as depicted. The animation tracks 61 interpolates the values for the look-up tables from the first keyframe K1 to the second keyframe K2. Structures that are not in either of the keyframes appear in the intermediate frames 71. This is not a smooth transition.

In order to generate a smooth transition, in an embodiment, the animation system 100 implements a windowing-compensated look-up table interpolation that retains the advantages of the explicit interpolation, but also maintains a visually consistent transition, similar to the implicit interpolation described above. Each of the animation tracks 61 manages the keyframes for a single (e.g. camera position) or a composite (e.g. paired windowing and look-up table per keyframe) animating parameter. The animation tracks 61 includes a parameter interpolation algorithm Each animation track 61 is an ordered collection of similar keyframes that, when played as an animation, shows a dynamic transition between them. Each of the animation tracks 61 may implement a number of algorithms for the interpolation of parameter values from the keyframes. Some examples include nearest neighbor, linear, and spline. In nearest-neighbor, for a time value t, the keyframe with the closest time tk is identified. The keyframe value is then the interpolated parameter value at time t. For linear, the keyframes k and k+1 are found so that tk<t<tk+1. The values of the two keyframes are then linearly interpolated based on the value of t. For spline, the interpolant is a piecewise polynomial, and based on the degree, additional adjacent keyframes may be required compared to the linear interpolation. Many variants may be used including the cubic spline, the natural cubic spline and the Catmull-Rom spline. Some splines may be non-interpolating.

Any of the interpolators 63 may be used by the animation tracks 61. However, prior to interpolation, the values for the look-up tables are resampled to be used with a windowing reference. After interpolation, the look-up tables are resampled back to respective windowing parameters. The respective windowing parameters are the interpolated windowing parameters for the respective time t. The windowing-compensated look-up table interpolation is described further below in the method of FIG. 4. In an embodiment a constrained spline interpolator may be used with the windowing-compensated look-up table interpolation.

Figure 3:
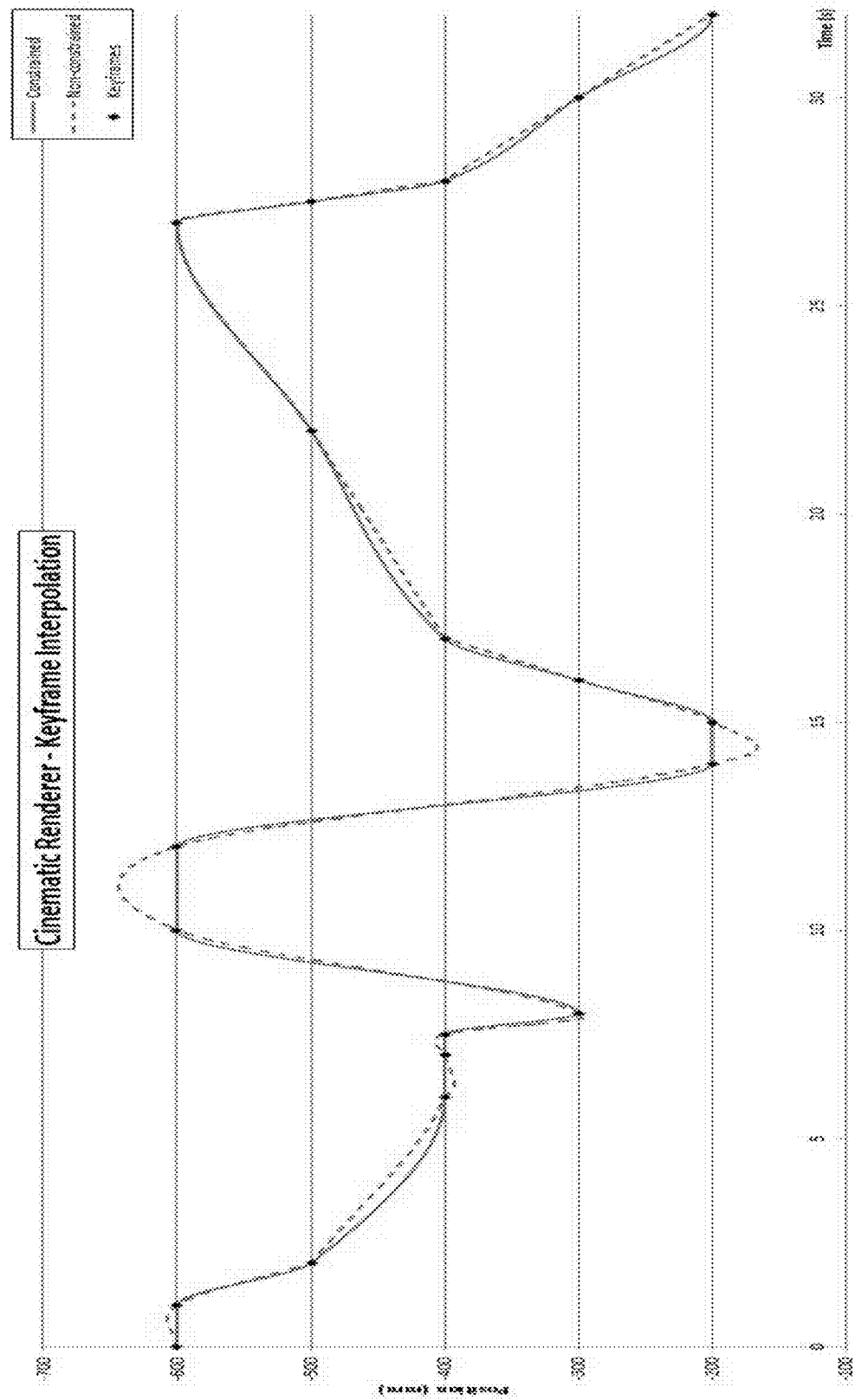
FIG. 3 depicts an example of interpolation using a constrained spline interpolator.

Natural spline interpolation is often used for computer animation. However, natural spline interpolation may lead to the reconstruction function overshooting the intended keyframe value. In an embodiment, a constrained spline interpolator is used. The constrained spline interpolator uses a spline interpolation that enforces a zero tangent at time to if the parameter value is a local minima or maxima. FIG. 3 depicts an example of a constrained spline interpolator. FIG. 3 depicts a series of keyframes that are interpolated using two different interpolators 63—a constrained spline interpolator (solid line) and a non-constrained spline interpolator (dotted line). Both interpolators 63 perform well for interpolating values within the bounds. However, the non-constrained spline interpolator overshoots the target at both times 11s and 14s. The constrained spline interpolator, however, is constrained and does not overshoot. The implicit look-up table interpolation described above may be extended to support the constrained spline interpolation. The renderer uses look-up tables Lk−1, Lk, Lk+1 and Lk+2 to generate four voxel classifications for the four adjacent keyframes, which allow the constrained spline interpolation to be used when interpolating the color and opacity at time t. The constrained spline interpolator is also used by the animation system 100 when using a windowing-compensated look-up table interpolation.

Figure 4:
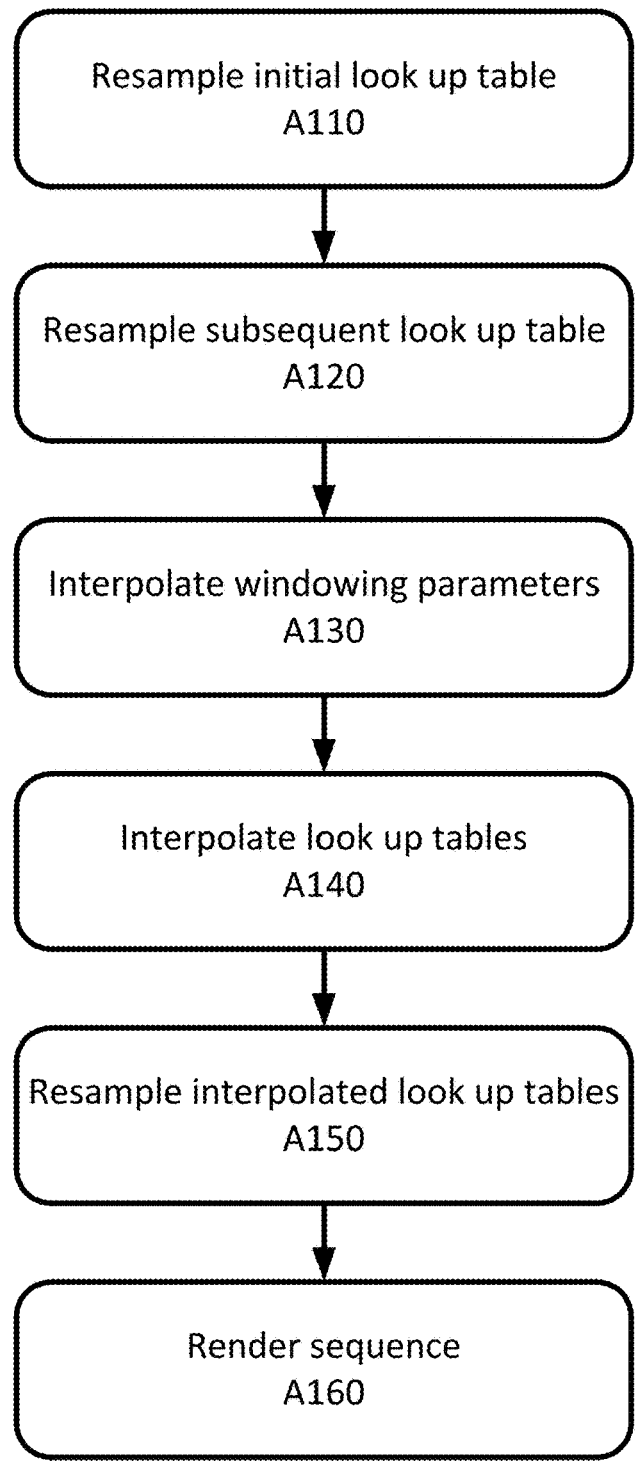
FIG. 4 depicts an example method for providing smooth transitions between volume rendering presets.

FIG. 4 depicts a method for windowing-compensated look-up table interpolation. The acts are performed by the system of FIG. 1 or FIG. 9, other systems, a workstation, a computer, and/or a server. The acts are performed in the order shown (e.g., top to bottom) or other orders.

In the embodiments described below, a user-driven creation of the keyframes is used for the desired visualizations of the 3D anatomy, but with an algorithmic generation of the transition animation. Further embodiments may use algorithmic generation of some of the keyframe data (e.g., anatomy-guided creation of a camera path, which avoids obstacles during the transition between the user's presets), or all of the keyframe data (e.g., fully automated rendering of animations, based on anatomy landmark detection and anatomy-specific voxel classification), while embodiment handle the rendering of the transitional images.

At act A110, an animation system 100 resamples a look-up table for an initial keyframe to a windowing reference and at act A120, the animation system 100 resamples a look-up table for a subsequent keyframe to the windowing reference. The resampling creates a look-up tables that includes values that are in line with the values of the windowing reference. A look-up table stores a set of values that are looked up by the volume renderer. Look-up tables provide an output value for each of a range of parameters. One example of a look-up table, called the colormap or palette, is used to determine the colors and intensity values with which a particular image will be displayed. For each keyframe a user or application may select from a variety of look-up tables, each one configured to produce specific characteristics in the rendered output. The look-up tables may provide the characteristics (e.g., color and opacity) from scalar voxel values obtained by a medical imaging device (e.g., radiodensity in Hounsfield unit in the case of CT data). A user or application may adjust the characteristics by changing the values in the look-up table to meet their needs. For example, a user may set a certain tissue to a certain color in a look-up table. When an image is rendered, the tissue will be rendered with the particular color. In addition to the values in the look-up table, the volume renderer may also use values for windowing to generate the image.

Windowing is the process of selecting some segment of the total value range and then displaying the values within that segment over the full range. In a simple example, an image ranges from full white to full black over a range of 1 to 100 using different shades of grey. If the windowing is set to 1 to 25, then the image will be rendered with shades of full white to full black over just 1 to 25 instead of from 1 to 100. Anything in the original image over 25 is rendered black. The ability of windowing to highlight or hide aspects in the volume or image allows viewing of different anatomy so helps in viewing the complexity of a three-dimensional patient volume. Windowing allows for a user or applications to set parameters that instruct the volume renderer to highlight or ignore certain structures or tissues when rendering the volume. In an example, a user or application may instruct the renderer to render the vessels in the heart and not the lungs. The look-up tables may include a color value for the vessels regardless of whether the vessels are in the heart and lungs. By using the windowing parameters, the user or application may restrict the visualization to either the vessels in the heart or the vessels in the lungs even while using the same look-up table. In an example, for CT scans, windowing may be used to enhance contrast for the particular tissue or abnormality type being evaluated.

Each of the look-up tables for keyframes are resampled to the windowing reference. The windowing reference may be a windowing setting that is set by the user or application or may be calculated as a function of the two keyframes. For example, the windowing reference may be the average windowing settings of the two keyframes. In an example, if the first keyframe uses windowing parameters to view the heart and the second keyframe uses windowing parameters to view the lungs, the windowing reference values may be an average or in between windowing settings of the two windowing parameters.

At act A130, the animation system 100 generates a plurality of windowing parameters for a plurality of frames between the initial keyframe and the subsequent keyframe as a function of the windowing parameters of the keyframes. Each of the animation tracks 61 of the animation system 100 manages the keyframes for a single (e.g. camera position) or a composite (e.g. paired windowing and look-up table per keyframe) animating set of parameters. The animation tracks 61 includes a parameter interpolation algorithm. The plurality of windowing parameters may be generated using the parameter interpolation algorithm. As described above, different algorithms may be used such as nearest neighbor, linear, and spline. For a spline based interpolated, the animation tracks 61 may use a constrained spline interpolator. The interpolator generates windowing parameters for each frame that is between the keyframes.

At act A140, the animation system 100 generates a plurality of look-up tables for the plurality of frames as a function of the resampled look-up tables. Similar to the generation of the plurality of windowing parameters, the animation system 100 and animation tracks 61 may use an interpolation algorithm to generate the plurality of look-up tables. Any interpolation algorithm may be used. For example, a nearest-neighbor interpolation algorithm, a linear interpolation algorithm, a spline interpolation algorithm, or a constrained spline interpolation algorithm may be used among others.

Figure 5:
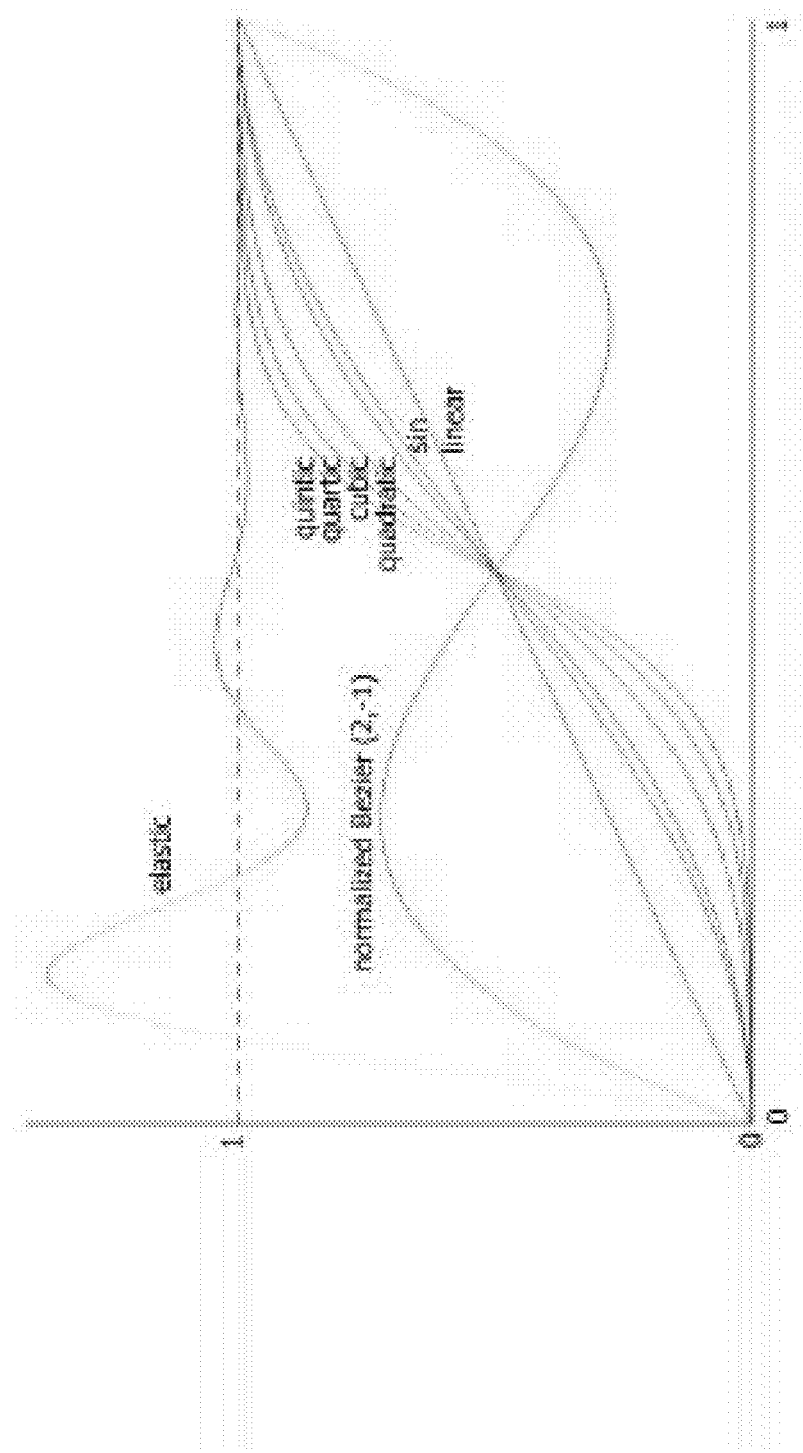
FIG. 5 depicts an example of easing functions.

For interpolation algorithms, an easing function may be used. Easing functions may be used to modify the interpolation of parameters that affect the voxel classification in order to create a consistent visual transition. Translation and scaling of existing easing function may be used. Alternatively, data-driven easing may use a look-up table, with values derived from measurements of the rendered image. For example, a voxel fade effect may have a non-linear response to the time parameter in the animation system 100, after multiple voxels are projected along a viewing ray. A look-up table easing function may be used to enforce a linear transition in the rendered images. In some embodiments, the look-up table is constructed automatically based on a perceptual or non-perceptual image metric. FIG. 5 depicts several examples of easing functions including elastic, normalized Bezier, quantic, quartic, cubic, quadratic, sin, and linear. Each of these functions may be used to adjust the interpolation so that a smooth transition is provided. When applying the easing functions, the time input to the animation system is input through the function before being used as input to the animation track interpolator. For example, the quintic easing function in FIG. 5 specifies a slow rate of change at the beginning and the ending of the transition, with a fast rate of change in the middle. Complex functions, such as the elastic easing, create an oscillating effect around the target parameter value.

At act A150, the animation system 100 resamples the plurality of look-up tables to the respective plurality of windowing parameters. For each look-up table for a time t, the look-up table is resampled for the windowing parameters of time t.

At act A160, the animation system 100 renders a sequence of frames using the look-up tables, the resampled plurality of look-up tables, and the second look-up table. A volume renderer 65 may use any type of rendering algorithms to generate a rendered frame. The volume renderer 65 may render shading, texture-mapping, shadows, reflections, depth of field, motion blue, etc. as a function of rendering presets stored in the look-up tables.

Figure 6:
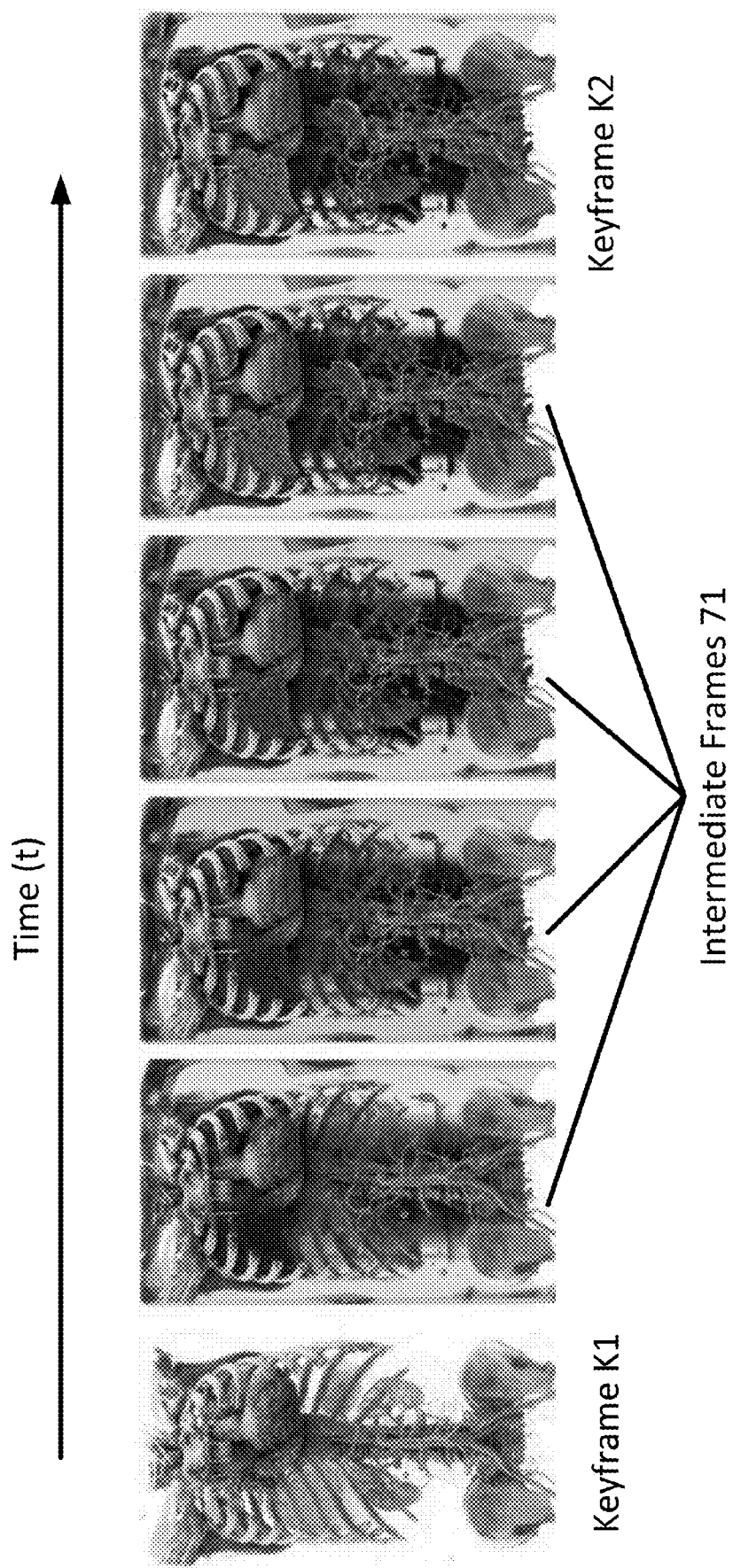
FIG. 6 depicts an example of a smooth transition between volume rendering presets using the windowing-compensated constrained spline interpolation.

FIG. 6 depicts a sequence of rendered frames. Similar to FIG. 2, FIG. 6 depicts two keyframes K1, K2 and four intermediate frames 71. The two keyframes K1, K2 include different preset values for color etc. The keyframes also include different windowing parameters. The transition from K1 to K2 is smooth over the intermediate frames 71.

In an embodiment, the windowing-compensated interpolation may be used to interpolate between adjacent keyframes that include different volumetric data. Act A110 may be modified to resample the volume data at each keyframe to a common coordinate system and resolution, so that each voxel in the volume may be processed as an independent animation track 61.

In certain embodiments photorealistic lighting may be computed as part of the volume rendering process using techniques such as image-based rendering or spherical harmonics (SH) lighting. Rendering presets may contain different transformations for the lighting environment (e.g., rotations of the light probe), or different lighting environments altogether (e.g., different light probes, or different SH coefficients). For lighting as with other parameters, it is desirable to provide a smooth interpolation during preset transitions. In an example, the volume renderer 65 may use light probes for image-based lighting. For implicit interpolation of the light probe at time t, a number of light probes from adjacent keyframes are loaded. The number of keyframes may depend on the reconstruction function (e.g., two for linear interpolation, four for cubic interpolation, etc.). For a given light ray direction, all light probes are evaluated, and the interpolation is performed on the final computed colors. Similar to the methods described above, this is referred to as implicit interpolation and it carries the same drawbacks, namely high resource usage at the rendering components for smooth interpolators 63.

Figure 7:
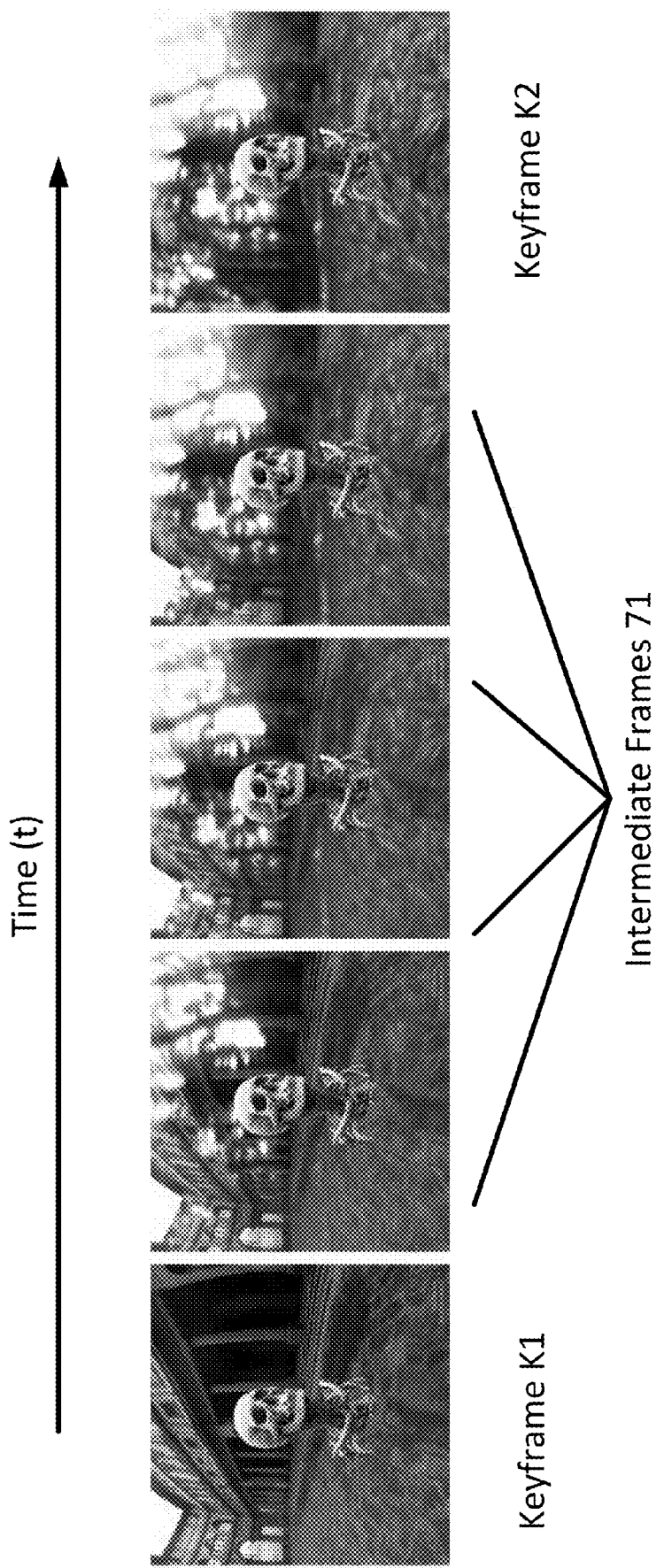
FIG. 7 depicts an example of a smooth transition between light probe presets.

FIG. 7 depicts an example of interpolation for two presets with different light probes. FIG. 7 depicts two keyframes K1, K2 that each include a different lighting scheme (here two different light probes). FIG. 7 further depicts three intermediate frames 71 between the keyframes K1, K2. Explicit light probe interpolation is performed at the animation system 100, where every light probe is first resampled to a common representation and resolution, using a reference transformation (e.g., an identity transformation with no rotational component). Possible lightprobe representations include the horizontal and vertical cross layouts, and the equirectangular projection. Afterwards, each element of the representation is treated as a separate animation track 61 during the interpolation process. In one embodiment, the interpolation process uses the constrained spline interpolator in order to avoid lighting colors that overshoot the colors specified in the lightprobes.

The sequence of frames that is output by the animation system 100 may be used for different applications. For example, the sequence of frames may be viewed on a display as a movie. In an example of the application of the method, a user creates a set of static images with the desired settings for viewing, volume classification, lighting, etc. The system automatically generates a movie with smooth transitions between the user's presets. The smooth transitions may also be used as part of an interactive viewer to animate rendering parameter changes during state transitions—e.g., loading a new preset, changing volume classification, undo/redo operations, etc.

One implementation for the windowing-compensated look-up table interpolation is in a cinematic renderer for medical imaging diagnosis. Users save multiple viewing and rendering configurations for their data, some with significantly different voxel classifications. The animation system 100 then produces high quality, high resolution videos that transition between the individual presets. Using cinematic rendering the generated animated sequence may be sued to shows clinical images of the human body in previously unknown, realistic photo quality. The hyper-realistic method of display not only makes it easier to communicate with patients and referring physicians, but also to train new medical practitioners. Cinematic rendering and animations with smooth transitions provide for clear presentation of the relative position of organs, tissues, and vessels which can help surgeons select the best operating strategy.

Another implementation is in virtual reality technologies. Imaging-based 3D simulations of the individual patient may be created. Depending on the type of surgery, the best approach is chosen based on virtual reality (VR) models or simulations that are explored using VR goggles. Virtual reality translates real data into digital data, thus allowing us to turn a medical scan into a virtual 3D clone of the patient. The surgeon can then prepare the procedure on the patient's virtual clone. In addition to virtual reality, augmented reality may also be used to provide a transparent view that may allow for the automation of complex surgical movements. Both virtual reality and augmented reality rely on fast volume rendering that includes smooth transitions. If there are bad transitions in the animations, the viewer may become disoriented or make a mistake.

Figure 8:
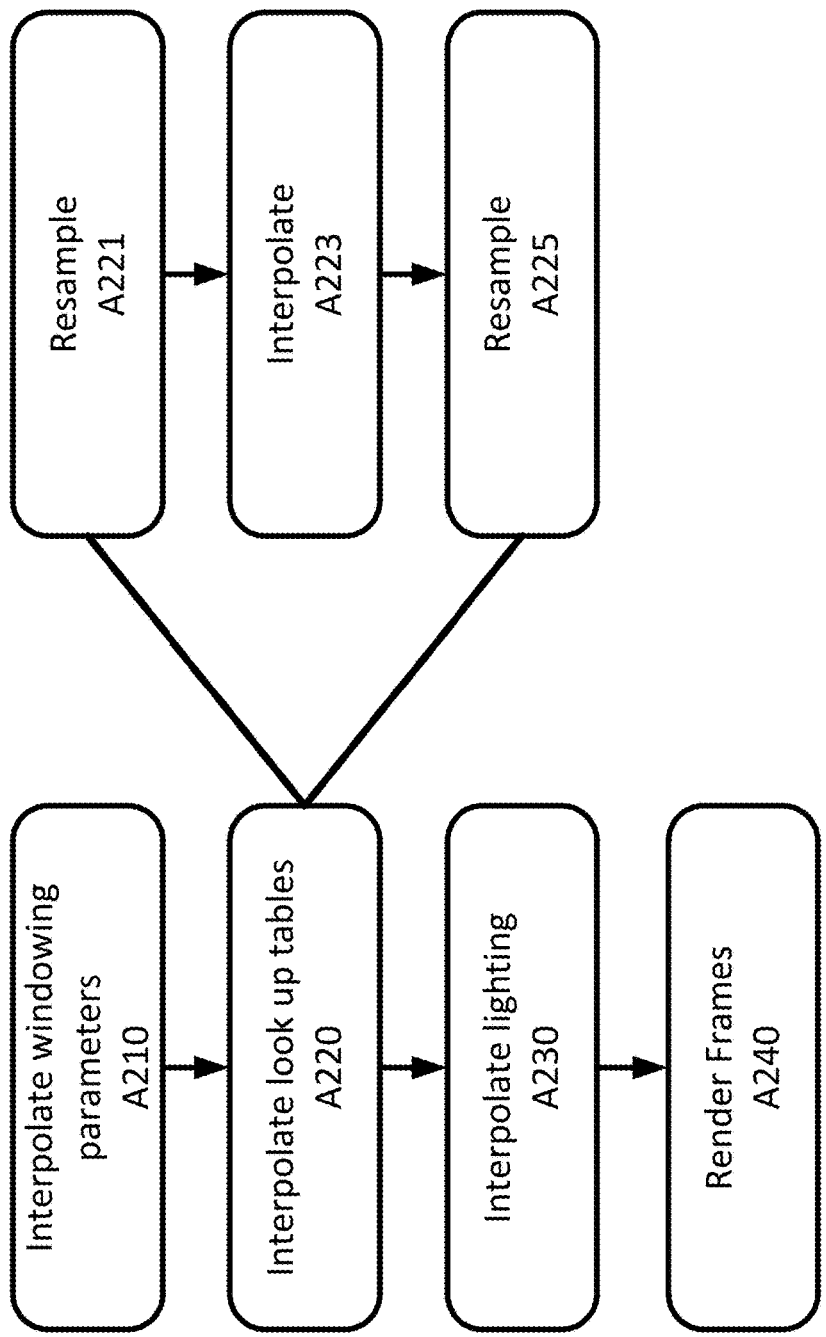
FIG. 8 depicts an example method for providing smooth transitions between volume rendering presets.

FIG. 8 depicts a method for creating smooth transitions between look-up tables for an animation system 100. The acts are performed by the system of FIG. 1 or FIG. 9, other systems, a workstation, a computer, and/or a server. The acts are performed in the order shown (e.g., top to bottom) or other orders.

At act A210 windowing parameters are interpolated for frames between keyframes in a sequence of keyframes using a constrained-spline interpolation. Windowing describes the process of extending a certain range of pixel/voxel values in the image to fill the entire range of the display. For medical imaging, windowing refers to how to display an intensity for the voxels. For example, in computed tomography, windowing may determine how to display the intensity of measured radiation. Windowing may also be referred to as grey-level mapping, contrast stretching, histogram modification or contrast enhancement. For CT, windowing is the process in which the CT image greyscale component of an image is manipulated via the CT numbers, changing the appearance of the picture to highlight particular structures. The brightness of the image is adjusted via the window level. The contrast is adjusted via the window width. For MR imaging, due to the inherent problem in the modality, MR images unlike CT cannot have standardized windows to enhance the contrast for a given tissue. However, in a global histogram of a volume, a given structure may have a fixed relation with respect the global structure (brain) across di☐erent volumes.

At act A220, look-up tables are interpolated for frames between the keyframes in the sequence of keyframes using a windowing compensated constrained spline interpolation. Look-up tables provide an output value for each of a range of index values. One common look-up table, called the colormap or palette, is used to determine the colors and intensity values with which a particular image will be displayed.

Acts A221, A223, and A225 describe the windowing compensated constrained spline interpolation. These acts may be repeated in order to generate interpolated frames for every time t of the sequence of frames in between a plurality of keyframes that have rendering parameters set by a user or automatically by an application.

At act A221, a respective look-up table is resampled for each keyframe in the sequence of keyframes to produce a respective voxel classification under a reference window. The look-up tables may be resampled to a common representation, for example an average windowing between the keyframes. For each keyframe K, with look-up table Lk and windowing Wk, the look-up table is resampled so as to produce the original classification under a reference windowing, Wref. Wref may be set to a fixed windowing (e.g., identity windowing or average windowing from the keyframes) in order to avoid resampling at each interpolation. At act A223, the resampled look-up tables are interpolated from a quantity (e.g. 2 for linear, 4 or more for spline) of adjacent look-up tables. The interpolated look-up tables are resampled for use with the interpolated windowing parameters. The look-up table interpolation is performed, treating each element of the tables as an independent animation tracks 61, using as many adjacent look-up tables as the interpolator requires (2 for linear, 4 for spline). The resulting look-up table produces the correct classification for windowing Wref. At act A225, the interpolated look-up table from act A223 are resampled for use with Wnew.

For interpolation, easing function may be used. Easing functions may be used to modify the interpolation of parameters that affect the voxel classification in order to create a consistent visual transition. Translation and scaling of existing easing function may be used. Alternatively, data-driven easing may use a look-up table, with values derived from measurements of the rendered image. For example, a voxel fade effect may have a non-linear response to the time parameter in the animation system 100, after multiple voxels are projected along a viewing ray. A look-up table easing function may be used to enforce a linear transition in the rendered images. In some embodiments, the look-up table is constructed automatically based on a perceptual or non-perceptual image metric.

At act A230, in certain embodiments, explicit light probe interpolation may be performed by the animation system 100, where every light probe is resampled to a common representation and resolution, using a reference transformation (e.g., an identity transformation with no rotational component). Possible light probe representations include the horizontal and vertical cross layouts, and the equirectangular projection. In an embodiment, the interpolation process uses the constrained spline interpolator in order to avoid lighting colors that overshoot the colors specified in the light probes.

Figure 9:
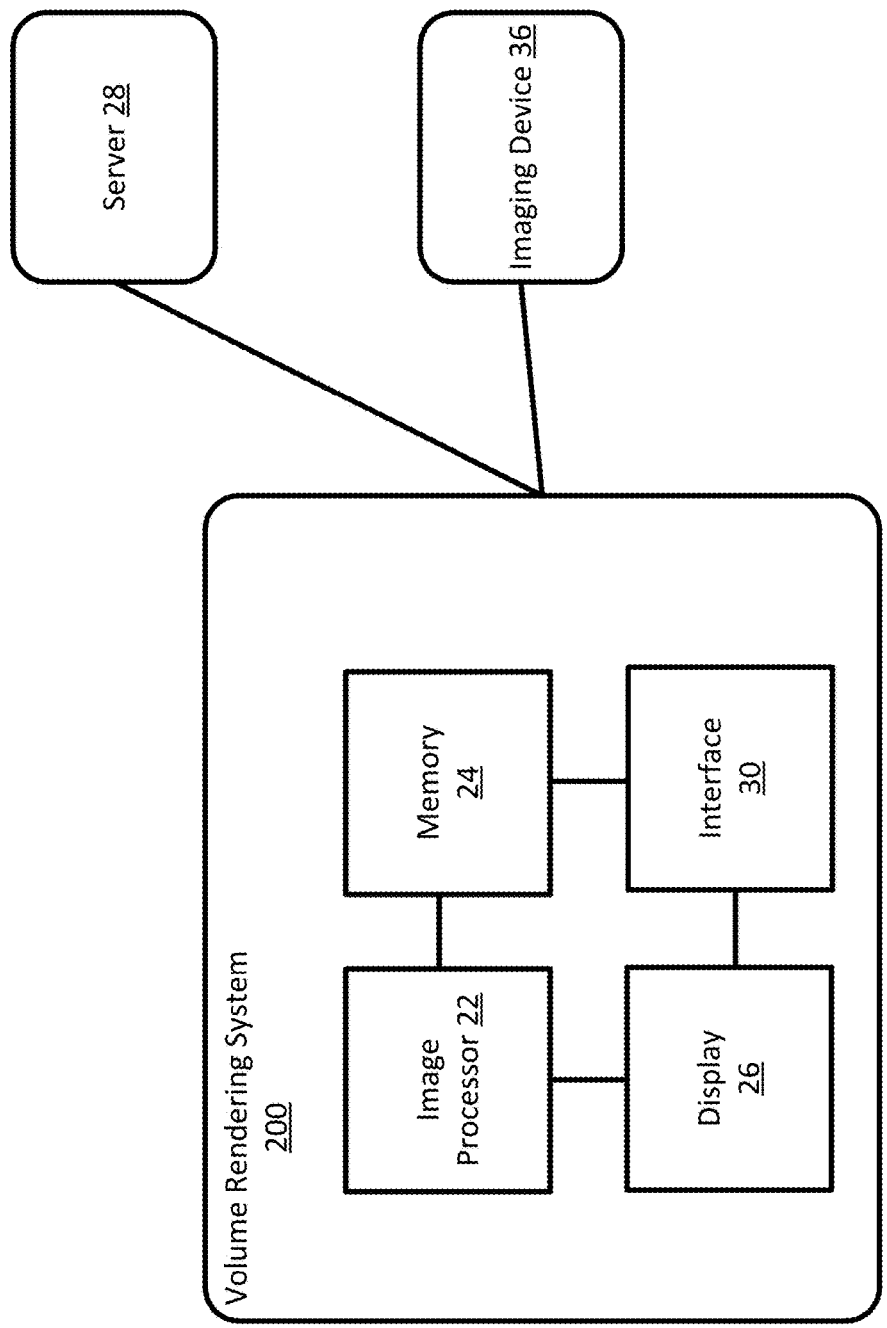
FIG. 9 depicts an example system for providing smooth transitions between volume rendering presets.

At act A240, the frames and keyframes are rendered to generate an animated sequence FIG. 9 depicts an embodiment of a system for creating smooth transitions between user defined keyframes. The system includes a volume rendering system 200, an imaging device 36, and a server 28. The volume rendering system 200 includes an image processor 22, a memory 24, a display 26, and an interface 30. Additional, different, or fewer components may be provided. For example, network connections or interfaces may be provided, such as for networking with a medical imaging network or data archival system. The imaging device 36 may be any medical imaging device, for example a CT imaging device or an MRI imaging device. The imaging device 36 is configured to acquired medical imaging data of a patient or an object and store the acquired medical image data in the memory 24.

The image processor 22, memory 24, display 26, and interface 30 are part of the volume rendering system 200. Alternatively, the image processor 22 and memory 24 are part of an archival and/or image processing system, such as associated with a medical records database workstation or server 28. In other embodiments, the image processor 22, memory 24, display 26, and interface 30 are a personal computer, such as desktop or laptop, a workstation, a server 28, a network, or combinations thereof. The image processor 22, display 26, interface 30, and memory 24 may be provided without other components for generating an animation sequence of medical imaging data.

The memory 24 may be a graphics processing memory, a video random access memory, a random-access memory, system memory, cache memory, hard drive, optical media, magnetic media, flash drive, buffer, database, combinations thereof, or other now known or later developed memory device for storing data or video information. The memory 24 is part of the volume rendering system 200, server 28, imaging device 36, part of a computer associated with the image processor 22, part of a database, part of another system, a picture archival memory, or a standalone device.

The memory 24 stores medical imaging data, graphical or display setting, values of rendering parameters, presets, lighting parameters, values of windowing parameters, look-up tables, interpolated values, and other data used to generate an animated sequence. The memory 24 or other memory is alternatively or additionally a non-transitory computer readable storage medium storing data representing instructions executable by the programmed image processor 25 for creating smooth transitions between look-up tables for a volume rendering system 200. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code, and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The image processor 22 is a general processor, central processing unit, control processor, graphics processing unit, digital signal processor, three-dimensional rendering processor, image processor, application specific integrated circuit, field programmable gate array, digital circuit, analog circuit, combinations thereof, or other now known or later developed device for processing and rendering medical imaging data. The image processor 22 is a single device or multiple devices operating in serial, parallel, or separately. The image processor 22 may be a main processor of a computer, such as a laptop or desktop computer, or may be a processor for handling some tasks in a larger system, such as in the server 28. The image processor 22 configured by instructions, design, hardware, and/or software to perform the acts discussed herein.

The image processor 22 and/or server 28 are configured to perform the acts discussed above for creating smooth transitions between look-up tables for a volume rendering system 200. The image processor 22 is configured to generate an animated sequence from a plurality of keyframes (K) and value for a plurality of parameters stored as windowing parameters or in a look-up table. For each keyframe K, with look-up table Lk and windowing Wk, the look-up table is resampled by the image processor 22 so as to produce the original classification under a reference windowing, Wref. Wref may be set to a fixed windowing (e.g., identity windowing or average windowing from the keyframes) in order to avoid resampling at each interpolation. During interpolation for time t, the values of the windowing parameters are interpolated using the image processor 22, resulting in Wnew. The look-up table interpolation is performed by the image processor 22, treating each parameter of the look-up tables as an independent animation tracks 61, using as many adjacent look-up tables as the interpolator requires (2 for linear, 4 for spline). The resulting look-up table produces the correct classification for windowing Wref 4. The interpolated look-up table is resampled by the image processor 22 for use with Wnew.

The image processor 22 is configured to perform instructions where one a proposed approach for windowing-compensated interpolation is used to interpolate between adjacent keyframes that contain different volumetric data. The image processor 22 resamples the volume data at each keyframe to a common coordinate system and resolution, so that each voxel in the volume can be processed as an independent animation tracks 61.

The image processor 22 is configured to render an animation sequence using the generated look-up tables. The image processor 22 may use any rendering algorithms to render the animation sequence. The image processor 22 and/or server 28 are configured to provide an image or a rendered animated sequence to the display 26 or to the memory 24. The display 26 is a monitor, LCD, projector, plasma display, CRT, printer, or other now known or later developed devise for outputting visual information. The display 26 receives images, graphics, text, quantities, or other information from the image processor 22, memory 24, and/or server 28. The display 26 is configured to provide image volumes to an operator.

The volume rendering system 200 may also include a user interface 30 that is configured to receive one or more selections from a user. The user interface 30 may include an input device such as one or more buttons, a keypad, a keyboard, a mouse, a stylus pen, a trackball, a rocker switch, a touch pad, a voice recognition circuit, or other device or component for inputting data. The user interface 30 and the display 26 may be combined as a touch screen that may be capacitive or resistive.

The server 28 connects to the volume rendering system 200 via a network. The network is a local area, wide area, enterprise, another network, or combinations thereof. In one embodiment, the network is, at least in part, the Internet. Using TCP/IP communications, the network provides for communication between the image processor 22 and the server 28. Any format for communications may be used. In other embodiments, dedicated or direct communication is used.

The server 28 is a processor or group of processors. More than one server 28 may be provided. The server 28 is configured by hardware and/or software. The server 28 may include one or more image processors 22. The one or more image processors 22 may operate serially or in parallel to process and render image data.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for creating smooth transitions between volume rendering presets comprising look-up tables and windowing parameters for an animation system, the method comprising:
   resampling a first look-up table for a first keyframe to reference windowing parameters;
   resampling a second look-up table for a second keyframe to the reference windowing parameters;
   interpolating windowing parameters for a plurality of intermediate frames between the first keyframe and the second keyframe as a function of first windowing parameters and second windowing parameters;
   interpolating, using an easing function, look-up tables for the plurality of intermediate frames as a function of the resampled first look-up table and the resampled second look-up table;
   resampling the look-up tables to the respective windowing parameters; and
   rendering an animated sequence of frames using the first look-up table, the resampled plurality of look-up tables, and the second look-up table.

2. The method of claim 1, further comprising:
   acquiring medical imaging data from a medical imaging system; and
   wherein rendering comprises rendering the animated sequence of the medical imaging data using the first look-up table, the resampled plurality of look-up tables, and the second look-up table.

3. The method of claim 2, wherein the medical imaging system is a magnetic resonance imaging system.

4. The method of claim 1, wherein the reference windowing parameters comprises windowing parameter values calculated as an average of windowing parameter values for the first keyframe and the second keyframe.

5. The method of claim 1, wherein interpolating the plurality of look-up tables comprises:
   interpolating using an offset easing function.

6. The method of claim 1, further comprising:
   resampling a third look-up table for a third keyframe to the reference windowing parameter; and
   resampling a fourth look-up table for a fourth keyframe to the reference windowing parameters;
   wherein the third keyframe and fourth keyframe are adjacent to the first keyframe and second keyframe; and
   wherein the resampled third look-up table and resample fourth look-up table are used for interpolating, resampling, and rendering.

7. The method of claim 6, wherein interpolating the plurality of look-up tables comprises:
   interpolating using a constrained-spline interpolation that enforces a zero tangent if a parameter value is a local minima or maxima.

8. The method of claim 1, wherein the first keyframe and the second keyframe contain different volumetric data, wherein the first look-up table and the second look-up table are resampled to a common coordinate system and resolution.

9. The method of claim 1, wherein the first look-up table and second look-up table are user generated.

10. A method for creating smooth transitions between look-up tables for an animation system, the method comprising:
    interpolating windowing parameters for intermediate frames between keyframes in a sequence of keyframes using a constrained-spline interpolation;
    interpolating look-up tables for intermediate frames between the keyframes in the sequence of keyframes using a windowing-compensated constrained spline interpolation, the windowing-compensated constrained spline interpolation comprising:
       resampling for each keyframe in the sequence of keyframes, a respective look-up table to produce a voxel classification under a reference window;
       interpolating the look-up tables for intermediate frames using a first quantity of adjacent look-up tables;
       resampling the interpolated look-up tables for use with the interpolated windowing parameters; and
    rendering an animated sequence from the intermediate frames and keyframes.

11. The method of claim 10, further comprising:
    interpolating lighting parameters for intermediate frames between the keyframes in the sequence using a spherical renderer-based interpolator for a light probe transition.

12. The method of claim 10, wherein the keyframes contain different volumetric data, wherein the look-up tables are resampled to a common coordinate system and resolution.

13. The method of claim 10, further comprising:
    acquiring medical imaging data from a medical imaging system; and
    wherein rendering comprises rendering the animated sequence of the medical imaging data.

14. A system for generating animated medical imaging data, the system comprising:
    a medical imaging device configured to acquire medical imaging data;

a memory configured to store rendering presets for a plurality of keyframes in a sequence of keyframes;

an image processor configured to interpolate windowing parameters for intermediate frames between the plurality of keyframes using a constrained-spline interpolation; the image processor further configured to interpolate the rendering presets for intermediate frames between the plurality of keyframes using a windowing-compensated constrained spline interpolation; the image processor further configured to render the intermediate frames and the keyframes into an animated sequence; and a display configured to display the animated sequence.

15. The system of claim 14 wherein the medical imaging device is a computed tomography imaging device.

16. The system of claim 14, wherein the medical imaging device is a magnetic resonance imaging device.

17. The system of claim 14, wherein the windowing compensated constrained spline interpolation uses reference windowing parameters calculated as an average of windowing parameter values for adjacent keyframes used for interpolation.

18. The system of claim 14, wherein the windowing compensated constrained spline interpolation uses an easing function.

19. The system of claim 14, wherein the windowing compensated constrained spline interpolation uses a constrained-spline interpolation that enforces a zero tangent if a parameter value is a local minima or maxima.

20. The system of claim 14, wherein the first keyframe and the second keyframe contain different volumetric data, wherein the first look-up table and the second look-up table are resampled to a common coordinate system and resolution.

* * * * *